Feb. 29, 1944.  E. L. FISCHER  2,343,050
TRIPOD IMPROVEMENT
Filed Sept. 11, 1941
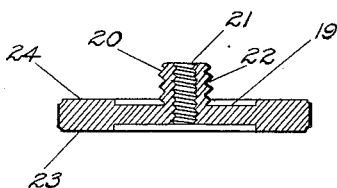
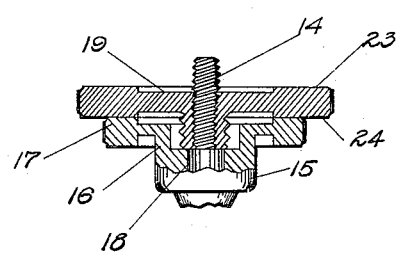
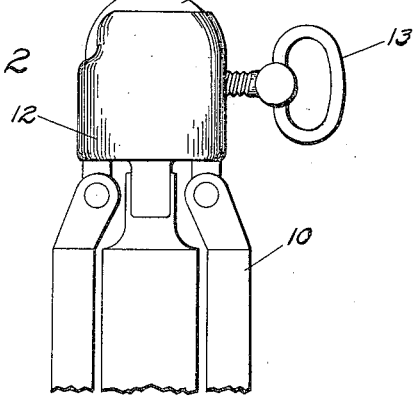
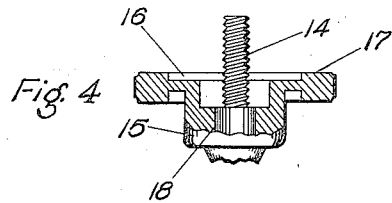
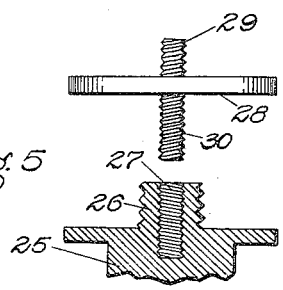
Edwin L. Fischer
INVENTOR
BY Philip S. Hopkins
William C. Babcock
ATTORNEYS Patented Feb. 29, 1944

2,343,050

UNITED STATES PATENT OFFICE 2,343,050

TRIPOD IMPROVEMENT

Edwin L. Fischer, Glendale, Calif., assignor to General Aniline & Film Corporation, New York, N. Y., a corporation of Delaware Application September 11, 1941, Serial No. 410,303

5 Claims. (Cl. 248—177)

This invention relates to a tripod head adapter.

It is well known that most cameras on the market are provided with a threaded recess whereby they may be mounted upon a tripod by engaging a threaded shaft in the tripot head. It is also well known that such recesses in the various makes and models of cameras differ in diameter, depth and type of thread used. The principal object of this invention is the provision of a tripod head adapter which will compensate for these variations thereby eliminating the many disadvantages caused by such lack of standardization.

Other important features of this invention lie in the simplicity of the head adapter both from the standpoint of its manufacture and application, and further, due to such simplicity, the relatively low cost of production.

While the invention is described as being used in connection with cameras and tripods it will be understood that the possibilities for the use of the same are unlimited. It is obvious that the principle of the invention may be used in almost any instance in which compensation between the size of aperture and screw and threads used may be required.

Further and additional objects of the invention will become apparent from the following specifications.

In the accompanying drawing forming a part of this application and in which like numerals are employed to designate like parts throughout the same, Figure 1 is a sectional side view of the adapter.

Figure 2 illustrates this invention, partly in cross section, used in connection with a tripod.

Figure 3 is a sectional side view of the adapter assembled in inverted position upon a tripod head, and Figure 4 is a side view of the tripod head shown partly in cross section.

Figure 5 is a view of a modified embodiment of the adapter and tripod head.

Referring first to Figure 2 of the drawing, the invention is illustrated as assembled upon a tripod having legs 10 and a universal consisting of a ball 11 and a socket 12. The set screw 13 is provided for retaining or locking the universal in any adjusted position.

Attached to the ball 11 is a threaded shaft or stud 14 adapted to engage the female threads in a recess provided in the platform or body of a camera, not shown, for securing the camera to the tripod. Secured at the base of the stud 14 which projects therethrough is a head 15 the body member being of substantially inverted bell shape, the skirt 16 of which is peripherally beaded or flanged as indicated at 17. The method of securing the head to the base of the shaft 14 may be by any of the well known expedients such as by providing the centrally disposed aperture 18 in the head 15 with corresponding threads for engagement with the shaft, or by shrinking the head upon the shaft, or, if preferred, the aperture 18 may be slightly larger in diameter than the base of the shaft thereby permitting its entire removal therefrom when desired. In the latter case, the head when in use will be retained upon the shaft by the adapter and/or camera when the assembly is complete, as will hereinafter be made apparent.

Referring next to Figure 1 of the drawing, the adapter of a substantially disc or plate-like shape generally indicated by the number 19, may be cast, stamped, machined or otherwise formed from any suitable material. Centrally disposed and an integral part of the adapter is a lug 20 having a threaded bore 21 of corresponding size and type respectively to accommodate the threaded shaft 14 projecting through the head 15. The lug 20 is externally threaded as shown at 22, such threads being of a contrasting size and type to the thread shaft 14 and adapted to engage a correspondingly threaded aperture in a camera of different model or make than the one for which the threaded shaft may be applicable.

Upon reference to the drawing it will be seen that the lug 20 projects from the surface of the disc like body of the adapter a distance equal to that which the shaft 14 projects through the head whereby the ends of the shaft and the lug are flush with each other when in the assembled relation as shown in Figure 2. Further, when the adapter is inverted with respect to the head, as illustrated in Figure 3, the lug rests upon the inner surface of the head adjacent the universal thereby contributing to the rigidity of the respective parts when assembled in such position. Contributing also to the rigidity of the assembly are the circumferential flanges or beads 23 and 24 provided respectively upon the opposite sides of the disc like adapter. When assembled the beads 23 and 24 contact respectively the bead 17 of the head 15 and the surface of the platform or body of the camera thus providing a firm foundation for the adapter and the camera.

In Figure 5, is shown another modification of the invention which will accommodate three different camera sockets. In this case, the tripod head 25 is provided with a projecting externally threaded screw 26. This screw will engage a camera socket of relatively large diameter. Screw 26 is centrally recessed and internally threaded, as at 27. This threaded recess or socket can be engaged by either of two projecting screws 29 and 30 on an adapter 28. Screws 29 and 30 are of the same diameter and thread, but differ in length. Thus the tripod and adapter combination can be selectively engaged with any one of three different camera sockets, i. e., a socket of large diameter, a long socket of smaller diameter, or a short socket of the same small diameter.

From the drawing and the foregoing description of the invention it will be understood that by proper use of the same the heretofore existing handicap imposed by lack of standardization in size and type of threaded apertures provided in the various makes and models of cameras may be overcome. For example, assuming that the shaft 14 is one-fourth of an inch in diameter and has twenty threads to the inch, by omitting the adapter 19 from the assembly, as in Figure 4, a camera having a comparatively deep aperture of the same diameter and type of thread as the shaft 14 may be accommodated. If, on the other hand, the camera is provided with a comparatively shallow aperture one-fourth of an inch in diameter and having twenty threads to the inch the adapter 19 is used in the assembly in the inverted position as shown in Figure 3. If the camera is provided with a larger aperture, for instance three-eighths of an inch in diameter, and having sixteen threads to the inch, the adapter is used with the lug uppermost as illustrated in Figures 1 and 2, it being understood that the lug is of the same external diameter and has corresponding external threads.

While two possible tripod head and adapter combinations have been shown, and while other forms may be apparent to those skilled in the art, the combination of Figures 1 to 4 represents the preferred form of the invention and has certain obvious advantages over such other arrangements.

It will be understood that certain embodiments of this invention are herein shown and described and that changes may be made in the shape, dimension and details of the various parts, in so far as they are suitable, without departing from the spirit and scope of the invention as defined by the appended claims.

I claim:

1. In a device of the character described, in combination with a tripod, a head comprising a threaded shaft attached to said tripod, a body member consisting of a beaded skirt and a base having a central aperture through which the threaded shaft projects extending beyond the plane of said bead and an adapter comprising a disc having an annular flange and a centrally disposed lug integral with said disc and having a threaded aperture of corresponding dimension and threads as said shaft and being provided with a contrasting external thread.

2. In a device of the character described, in combination with a tripod for cameras having threaded apertures of varied dimensions and type, a head comprising a threaded shaft attached to the tripod, a body member consisting of a beaded skirt and a base having a centrally disposed aperture through which said threaded shaft projects extending beyond the plane of said bead for engagement with said camera aperture of corresponding dimension and thread, and an adapter comprising a flanged disc, a lug integral therewith and having a central bore of corresponding dimension and threads to said shaft, the outer dimension of the lug being greater and provided with a contrasting thread, said adapter being operable with said head for engaging camera apertures of varied dimensions and threads.

3. In a device of the character described, in combination with a tripod for cameras having threaded apertures of varied dimensions and type, a head comprising a threaded shaft attached to said tripod, a body member consisting of a base and a skirt having a bead disposed about the outer periphery thereof, said base having a central aperture through which said threaded shaft projects extending beyond the plane of said bead to furnish engaging means for a camera having a threaded aperture of one dimensions and type, and an adapter comprising a disc, annular flanges provided on the opposite sides of the disc at the outer periphery thereof and a centrally disposed lug integral with said disc and having a threaded bore of corresponding dimensions and threads for engagement with the shaft and being provided with a contrasting external thread, said adapter being operable in one position with respect to said head to furnish engaging means for a threaded camera aperture of a second dimension and type different from that engageable by said shaft and operable in an inverted position with respect to said head to furnish engaging means for a threaded camera aperture of a different depth than that engageable by said shaft without said adapter.

4. A tripod including a head, a screw of given size projecting from said head, said head having a recessed portion around the base of said screw, and a removable and reversible adapter threaded on said screw and having on one face a projecting lug, said lug being externally threaded and forming a second screw of different size when said adapter is threaded on said first screw with said lug outermost, said lug being accommodated by said recessed portion when the adapter is reversed whereby said adapter, when so reversed, shortens the effective length of said first screw.

5. A tripod including a head, a screw of given size projecting from said head, said head having a recessed portion around the base of said screw, and a removable and reversible adapter threaded on said screw and having on one face a projecting internally threaded lug also fitting said screw, said lug being externally threaded and forming a second screw of different size when said adapter is threaded on said first screw with said lug outermost, said lug being accommodated by said recessed portion when the adapter is reversed whereby said adapter, when so reversed, shortens the effective length of said first screw.

EDWIN L. FISCHER.